(12) United States Patent
Yong et al.

(10) Patent No.: US 9,606,949 B1
(45) Date of Patent: Mar. 28, 2017

(54) UNIVERSAL SCALABLE SYSTEM: ON-THE-FLY SYSTEM PERFORMANCE CONVERSION VIA PC-ON-A-CARD AND USB FOR SMART DEVICES AND IOT ENABLING

(71) Applicant: INTEL CORPORATION, Santa Clara, CA (US)

(72) Inventors: Khang Choong Yong, Puchong (MY); Khai Ern See, Batu Gajah (MY); Amit Kumar Srivastava, Penang (MY); Jackson Chung Peng Kong, Tanjung Tokong (MY); Teong Keat Beh, Bayan Lepas (MY); Eng Huat Goh, Ayer Itam (MY)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/864,019

(22) Filed: Sep. 24, 2015

(30) Foreign Application Priority Data

Dec. 15, 2014 (MY) ............................ PI2014703801

(51) Int. Cl.
| | |
|---|---|
| G06F 3/00 | (2006.01) |
| G06F 13/38 | (2006.01) |
| G06F 13/40 | (2006.01) |
| G06F 3/06 | (2006.01) |
| G06F 11/14 | (2006.01) |

(52) U.S. Cl.
CPC ............ G06F 13/385 (2013.01); G06F 3/065 (2013.01); G06F 3/0634 (2013.01); G06F 3/0673 (2013.01); G06F 11/1456 (2013.01); G06F 13/4022 (2013.01); G06F 13/4081 (2013.01); G06F 2201/84 (2013.01)

(58) Field of Classification Search
None
See application file for complete search history.

(56) References Cited

U.S. PATENT DOCUMENTS

| | | | | |
|---|---|---|---|---|
| 8,352,644 B2 * | 1/2013 | Malamant | ............. | G06F 1/3203 710/16 |
| 2003/0221036 A1 * | 11/2003 | Konetski | ............... | G06F 1/1632 710/303 |
| 2008/0270767 A1 * | 10/2008 | Sonobe | ................... | G06F 1/263 712/221 |
| 2011/0131397 A1 * | 6/2011 | Aida | ..................... | G06F 9/4812 712/228 |
| 2011/0320861 A1 * | 12/2011 | Bayer | ................. | G06F 11/2033 714/5.11 |
| 2012/0173922 A1 * | 7/2012 | Cheng | ................. | G06F 11/1417 714/13 |
| 2015/0301955 A1 * | 10/2015 | Yakovenko | ............. | G06F 12/14 711/163 |
| 2016/0109923 A1 * | 4/2016 | Chen | ....................... | G06F 1/324 713/322 |

* cited by examiner

Primary Examiner — Elias Mamo
(74) Attorney, Agent, or Firm — Carrie A Boone PC

(57) ABSTRACT

A universal interconnection scheme enables system architecture modularization with a hot-pluggable external computing module, such as a PC-on-a-card device using USB type-C technology. With the flexibility to interchange the system computing module with an external module, system performance can be augmented to fulfill the essential needs of the user, whether the system is a portable low-power tablet device, a smartphone, a wearable device such as an Internet of Things device, or a high-performance PC.

18 Claims, 7 Drawing Sheets

Figure 3
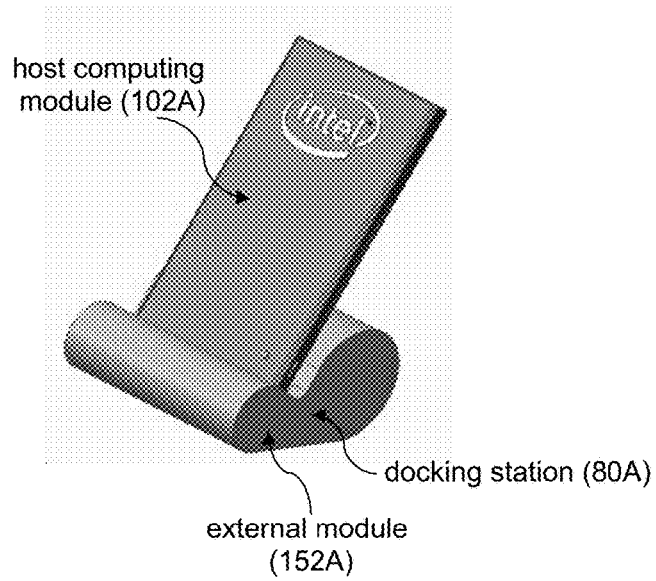
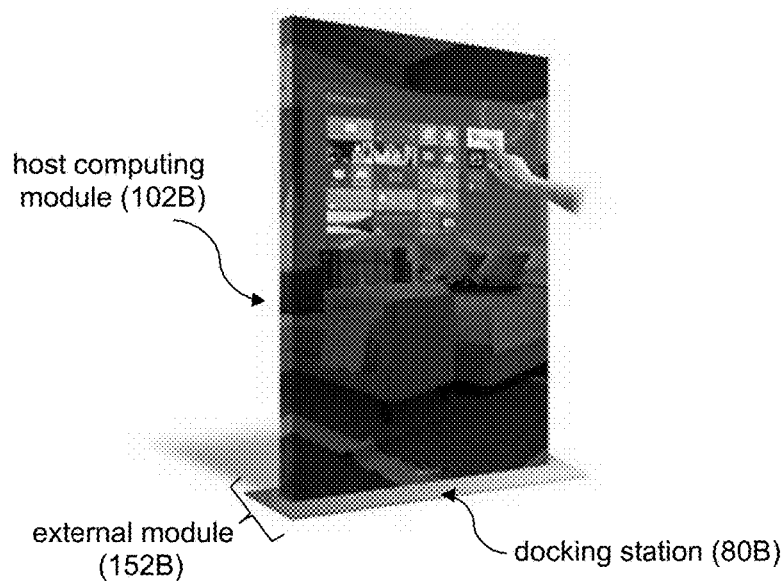

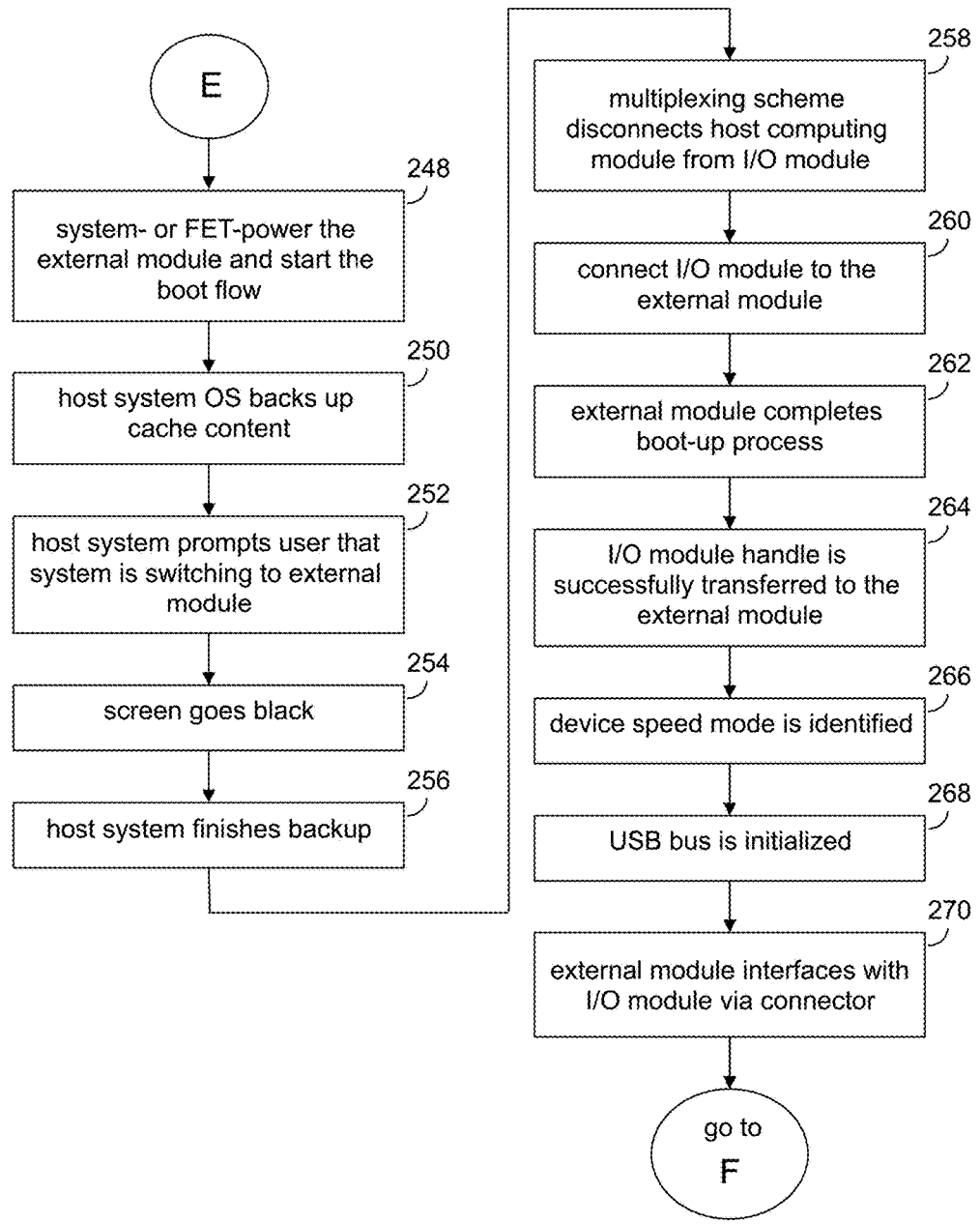

US 9,606,949 B1

UNIVERSAL SCALABLE SYSTEM: ON-THE-FLY SYSTEM PERFORMANCE CONVERSION VIA PC-ON-A-CARD AND USB FOR SMART DEVICES AND IOT ENABLING

CROSS-REFERENCE TO RELATED APPLICATIONS

This application is a continuation of and claims priority to Malaysian Patent Application No. PI2014703801, filed on Dec. 15, 2014, which is incorporated herein by reference in its entirety.

TECHNICAL FIELD

This application relates to external computing modules, PC-on-a-card, scalable system architecture, system modularization, system performance augmentation, and universal serial bus (USB).

BACKGROUND

In systems having a rigid set of performance requirements or power-centric design criteria, conventional system architecture often cannot scale these designs to different devices in order to cater to different usage models. Modifying either the performance or the power consumption prove to be difficult in such designs. A high-performance PC may be appropriate for heavy duty work, whereas a portable and durable tablet makes sense for leisure activity. Users are not expected to spend large sums of money on a device that is expected to be replaced frequently.

Thus, there is a continuing need for a device and methodology to overcome the shortcomings of the prior art.

BRIEF DESCRIPTION OF THE DRAWINGS

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

FIG. 3 is two illustrations of how the universal scalable system of FIG. 1 can be connected to an external module by way of a docking station, according to some embodiments; and FIGS. 4-7 are flow diagrams illustrating the operations of the universal interconnection scheme of FIG. 2 operable on the universal scalable system of FIG. 1, according to some embodiments.

DETAILED DESCRIPTION

Figure 1:
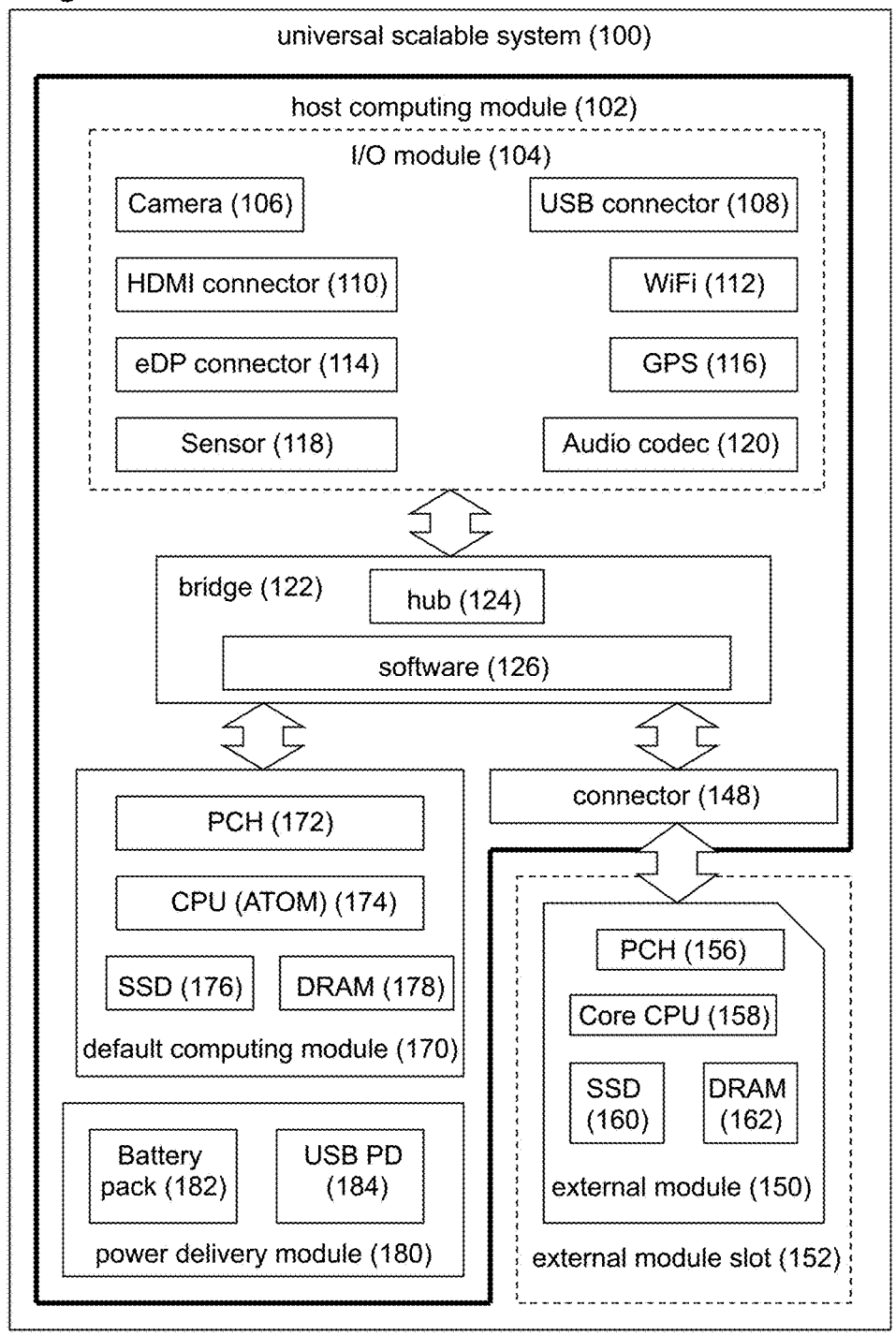
FIG. 1 is a high-level block diagram of a universal scalable system, according to some embodiments.

In accordance with the embodiments described herein, a universal interconnection scheme enables system architecture modularization with a hot-pluggable external computing module (such as a PC-on-a-card device) via a USB technology. With the flexibility to interchange the system computing module with an external module having capability that varies from the system computing module, system performance can be augmented to fulfill the essential needs of the user, whether the system is a portable low-power tablet device, a smartphone, a wearable device such as an Internet of Things (IoT) device, or a high-performance personal computer (PC).

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified. In this document, the term "or" is used to refer to a nonexclusive or, such that "A or B" includes "A but not B," "B but not A," and "A and B," unless otherwise indicated.

A. Overview of the Universal Scalable-System Solution

Figure 2:
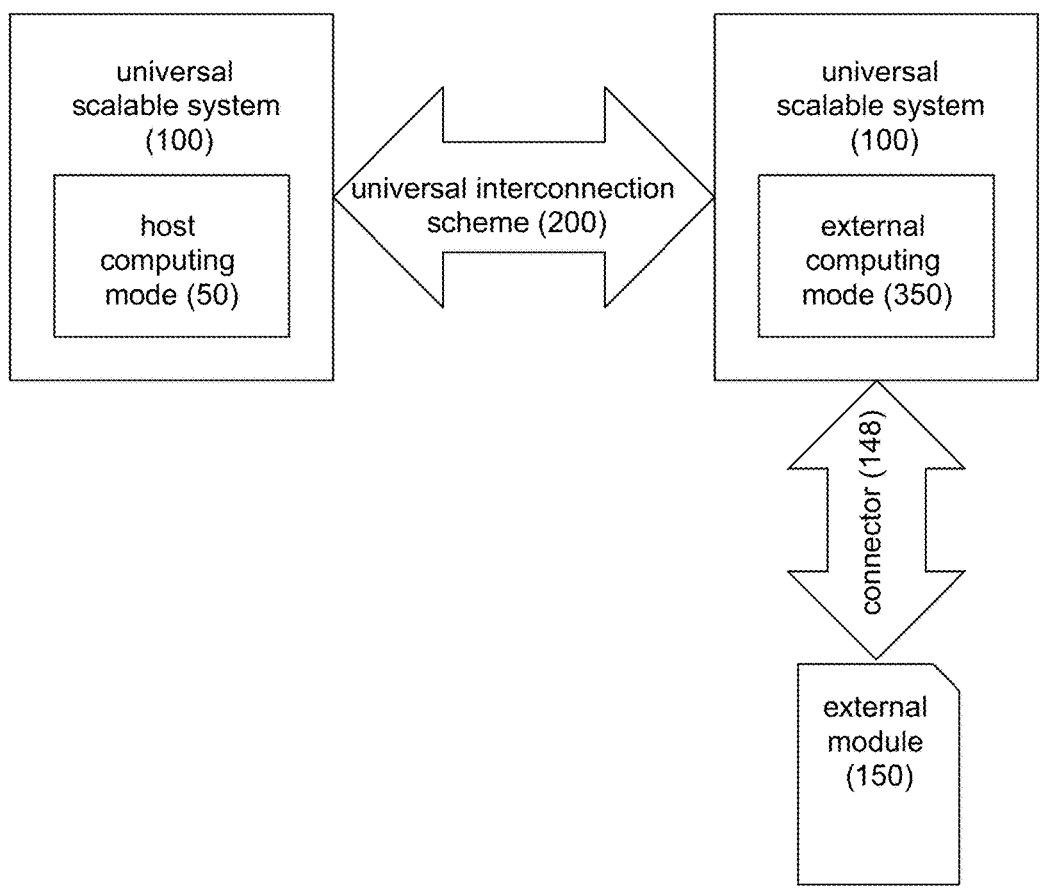
FIG. 2 is a simplified block diagram of a universal interconnection scheme and its relationship to the universal scalable system of FIG. 1, according to some embodiments.

FIG. 1 is a high-level block diagram of a universal scalable system 100 in which a universal interconnection scheme 200 is employed to achieve system architecture modularization, according to some embodiments. A simplified block diagram in FIG. 2 illustrates the relationship between the universal scalable system 100 and the universal interconnection scheme 200.

The universal scalable system 100 consists of a host system, also known as a host computing module 102, and an external hot-pluggable computing module 150, such as a PC-on-a-card, a PC-on-a-stick, a Pendriver, or similar device. The host computing module 102 consists of an I/O module 104, a bridge 122, a default computing module 170, a power delivery module 180, and a connector 148 or universal connector. In some embodiments, the connector is a multiple-mode cable capable of carrying audio, video, and power. In some embodiments, the connector 148 is fully reversible in that insertion is allowed in two directions. In some embodiments, the connector 148 is based upon a USB Type C specification, such as a USB Type C connector. In FIG. 1, a thick line surrounds the host system 102.

In some embodiments, the power delivery module 180 consists of a battery pack 182 and/or a USB power delivery (PD) device 184, so as to deliver power to the system 100. The type of battery varies according to the type of device, with nickel metal hydride and lithium ion batteries being but two available technologies. The universal scalable system 100 may be a portable device such that the power delivery module 180 is fully portable and separate from an electrical power source such as an electrical grid.

An external module slot 152 enables hot-plugging of the external module 150 into and out of the host computing module 102 as desired. The host computing module 102 and the external module 150 are interconnected through a standard bridge 122. The bridge 122 consists of a software program 126 that employs a multiplexing scheme to selectively activate between the default computing module 170, the external computing module 150, and the I/O expander function (hub) 124 in response to a condition, whether it be a user prompt, automatic enablement of the external computing module once connected, or one or more other conditions.

In some embodiments, the universal scalable system 100 provides a clear partition between the computing module 170 and input/output (I/O) module 104, such that the external module 150, when connected to the host computing module 102, replaces the computing module 170. In other embodiments, the computing module 170 and the external module 150 are capable of operating together, making the universal scalable system 100 a multiprocessor system. The universal scalable system 100 improves system performance by enabling on-the-fly computing module changes through the interconnection scheme 200, as described below.

In some embodiments, the universal interconnection scheme 200, consisting of both hardware and software operations, takes place inside the bridge 122, as described below. The host computing module 102 may be a small computing device, such as a tablet, a smart phone, a laptop computer, or other computing machine.

The default computing module 170 consists minimally of a central processing unit (CPU) 174, a platform controller hub (PCH) 172, and both volatile storage and non-volatile storage, in this case consisting of a solid state drive (SSD) 176 and a dynamic random access memory (DRAM) 178, respectively, although other types of volatile and non-volatile storage may also be used. In some embodiments, the CPU 174 making up the default computing module 170 is an atomic (atom) CPU, in contrast to a core CPU 158, which is part of the external module 150, as described below. As used herein, the atom CPU 174 is a lower performance CPU than the core CPU 158. Thus, in some embodiments, when no external module 150 is connected to the host system 102, the system 100 operates in a lower performance mode than when the external module is connected and activated.

The I/O module 104 further includes several components that are typically available in small computing devices. In some embodiments, the I/O module 104 consists of a camera 106, a wireless fidelity (WiFi) component 112, a global positioning system (GPS) component 116, a sensor 118, and an audio compression/decompression (codec) component 120. Further, connectors such as a high-definition multimedia interface (HDMI) connector 110, an embedded display port (eDP) connector 114, and a USB connector 108 may also be found in the I/O module 104. The illustrated components represent a subset of the variety of components, functions, and operating modes that may be part of the system 100. The I/O functions are clearly partitioned from the computing module functions, in some embodiments, to support the universal interconnection scheme 200.

In some embodiments, the external module 150 is connected to the host computing module 102 by inserting, sliding, coupling, or otherwise affixing the external module into the external module slot 152, with the slot being coupled to the USB connector 148, such as the USB type-C connector. The USB type-C interface allows a 10 gigabits-per-second (Gbps) transmission data rate, high definition video and audio transmission, as well as fast power charging. In some embodiments, the external module 150 is not a PC-on-a-card, but is another type of USB type-C computing module, such as a USB stick.

In some embodiments, the external module slot 152 is a tapered PC-on-a-card design (with one side being tapered so as to be inserted in the correct orientation). In some embodiments, the USB connector 148 is made directional to increase the number of peripheral pins. For example, where the connector 148 conforms to the USB Type C specification, the connector pins 148 are flattened into a single row to reduce the height in the vertical direction (system Z height).

In some embodiments, the external module 150 is a very small form factor component. Very small form factor boards measuring ~1500 mm$^2$ include core CPU capability. A secure digital (SD) memory card measures 32×24×2.1 millimeters, for example. The external module 150, with platform optimization, may potentially achieve a size approaching that of an SD memory card, in some embodiments.

The external module 150 consists of many components similar to the default computing module 170, namely, a PCH 156, a core CPU 158, and both non-volatile and volatile storage, in this case, an SSD 160 and a DRAM 162, respectively. In some embodiments, the core CPU 158 is a higher-performing CPU than the atom CPU 174 of the default computing module 170. The external module 150 may be a card such as a PC-on-a-card that is externally coupled to the host computing module 102 via the USB connector 148. Or, the external module 150 may be embedded in a docking station, but also coupled via the USB connector 148. These are but two examples of the many form factors in which the host computing module 102 may be joined with the external module 150.

FIG. 2 is a simplified block diagram showing how the universal scalable system 100 and the universal interconnection scheme 200 relate to one another, according to some embodiments. For purposes of this disclosure, the universal scalable system 100 may be in one of two computing modes: a host computing mode 50 in which the default computing module 170 is operable, and an external computing mode 350 in which the external module 150 is operable. As shown in FIG. 2, the external computing mode 350 cannot take place unless there is an external module 150 such as a PC-on-a-card. The universal interconnection scheme 200, a combination of hardware and software elements that operates in the bridge 122 of the I/O module 104, switches the universal scalable system 100 from the host computing mode 50 to the external computing mode 350, and vice-versa.

FIG. 3 presents two examples of how the host computing module 102 and the external module 150 may be coupled using a docking station. A first host computing module 102A consists of a smart card that, when coupled to a docking station 80A, is electrically connected to the external module 150A (with the external module 150 being somewhere inside the docking station). When not connected to the docking station 80A, the computing power of the smart card 102A is based on the CPU 174 in the default computing module 170 (FIG. 1). However, when seated in the docking station 80A, the smart card 102A is electrically coupled to the external module 150, thus enhancing the computing power of the smart card (if the external computing mode 350 is activated).

A second host computing module 102B in FIG. 3 consists of a tablet, with the tablet having the computing power of the default computing module 170 (that is, atomic computing power). Once seated on the docking station 80B (collectively, "docking stations 80"), the tablet 102B is electrically connected to the external module 150B (also somewhere inside the docking station). Once the external module 150B is detected and activated, the tablet 102B has the core computing power delivered by the CPU 158.

In some embodiments, the universal scalable system 100 has the capability to switch between use of the atomic CPU 174 (and its associated PCH 172, SSD 176, and DRAM 178) and the core CPU 158 (and its associated PCH 156, SSD 160, and DRAM 162), depending on whether the host computing module 102 is coupled to a docking station (or standalone external module 150). In some embodiments, the system 100 and the universal interconnection scheme 200, explained in more detail below, enables system scalability that gives the devices such as the smart card 102A and the tablet 102B several advantages.

For one, the system 100 and universal interconnection scheme 200 enable on-the-fly transformation from an atomlike performance to a core-like performance, i.e., a single device for both endurance and high-performance usages. For example, the external module 150 may be plugged into the tablet 102B to perform heavy-duty works, and unplugged for leisure and endurance uses.

Another benefit is the ease of change to achieve technology transparency. Thus, atom-based devices may be readily upgraded to core-based devices without having to buy another device, whether smart card, tablet, laptop computer, etc. Further, a user's preferred system may be fulfilled by allowing device identification (ID) and performance customization. For example, a personalized iPhone 6 may be enhanced with iPhone 6 ID and a proprietary core CPU.

Further, the universal scalable system 100 and universal interconnection scheme 200 empower the portable PC with a smartphone, tablet, and any Internet of Things (loT) devices. For example, a portable PC may be transformed by coupling with the external module 150, such as a PC-on-a-card. The universal scalable system 100 and universal interconnection scheme 200 further may integrate user experiences and offer "one device for all usage". Another benefit is that the universal scalable system 100 and the universal interconnection scheme 200 may enable tablet manufacturers to reduce cost and shorten time to market by easing engineering burdens and dependency on full system requirements.

B. Usage Model

In some embodiments, the performance of the universal scalable system 100 can be augmented in at least three ways. First, the universal scalable system 100 can be plugged into one of various types of computing modules via the USB connector 148, such as the PC-on-a-card device 150. Or, the universal scalable system 100 can be plugged into a docking station in which one of various types of computing modules resides, such as the PC-on-a card device 150, as illustrated in FIG. 3. Also, the universal scalable system 100 may be docked to a docking station in which a high-power computing module resides (e.g., one having more computing power than the core CPU 158 of FIG. 1 provides).

C. Process Flow

Figure 4:
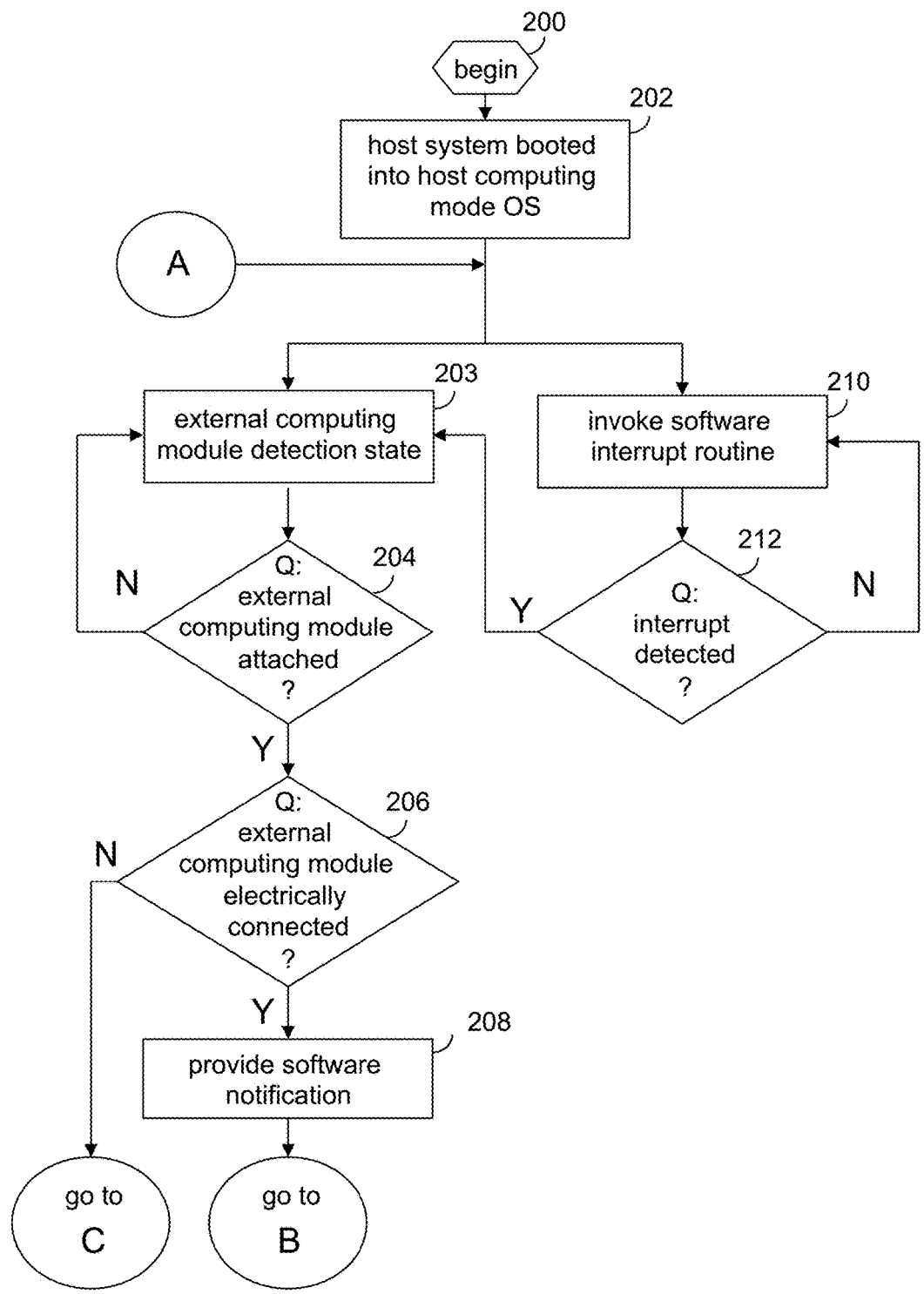
Figure 5:
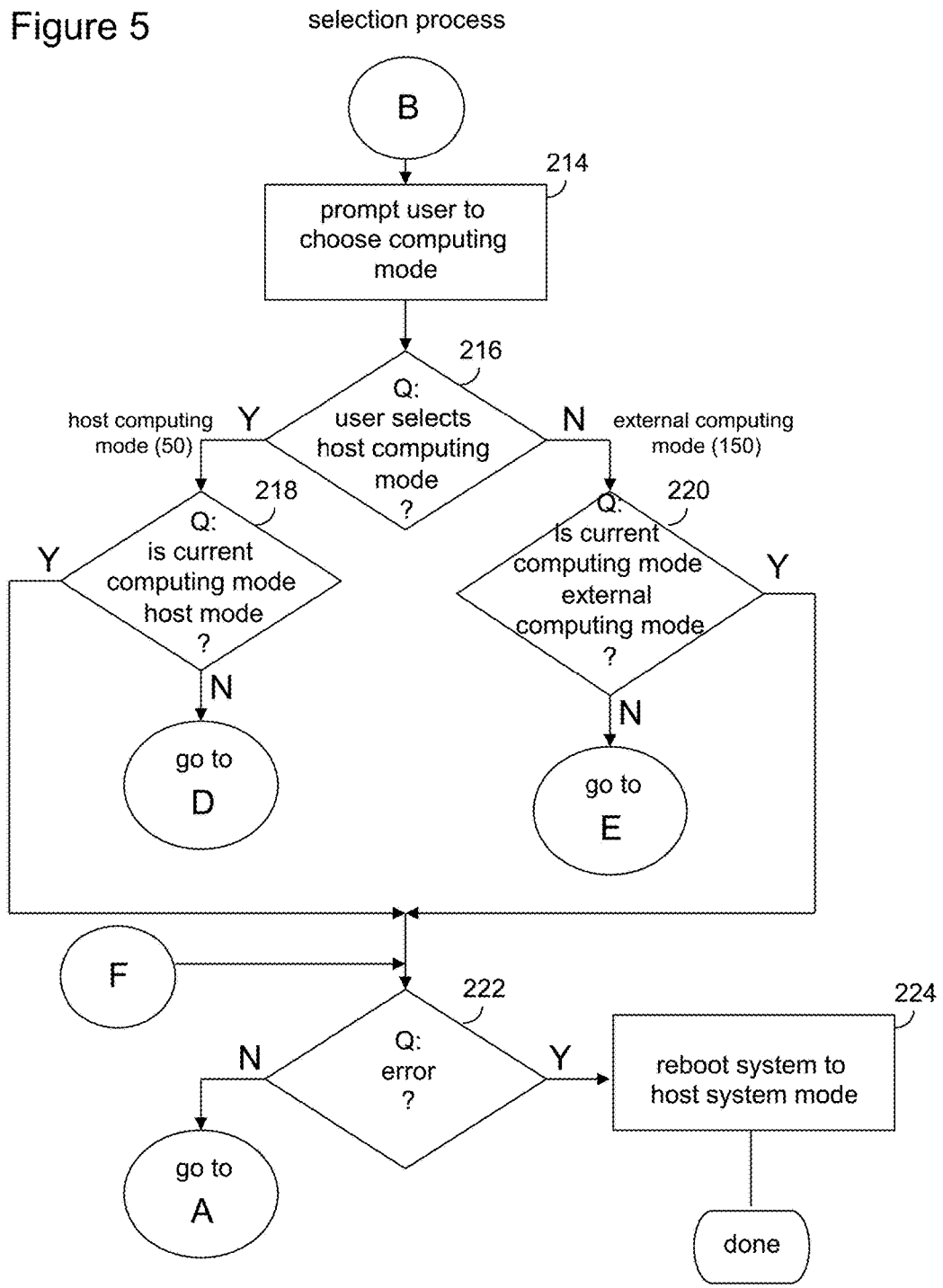
Figure 6:
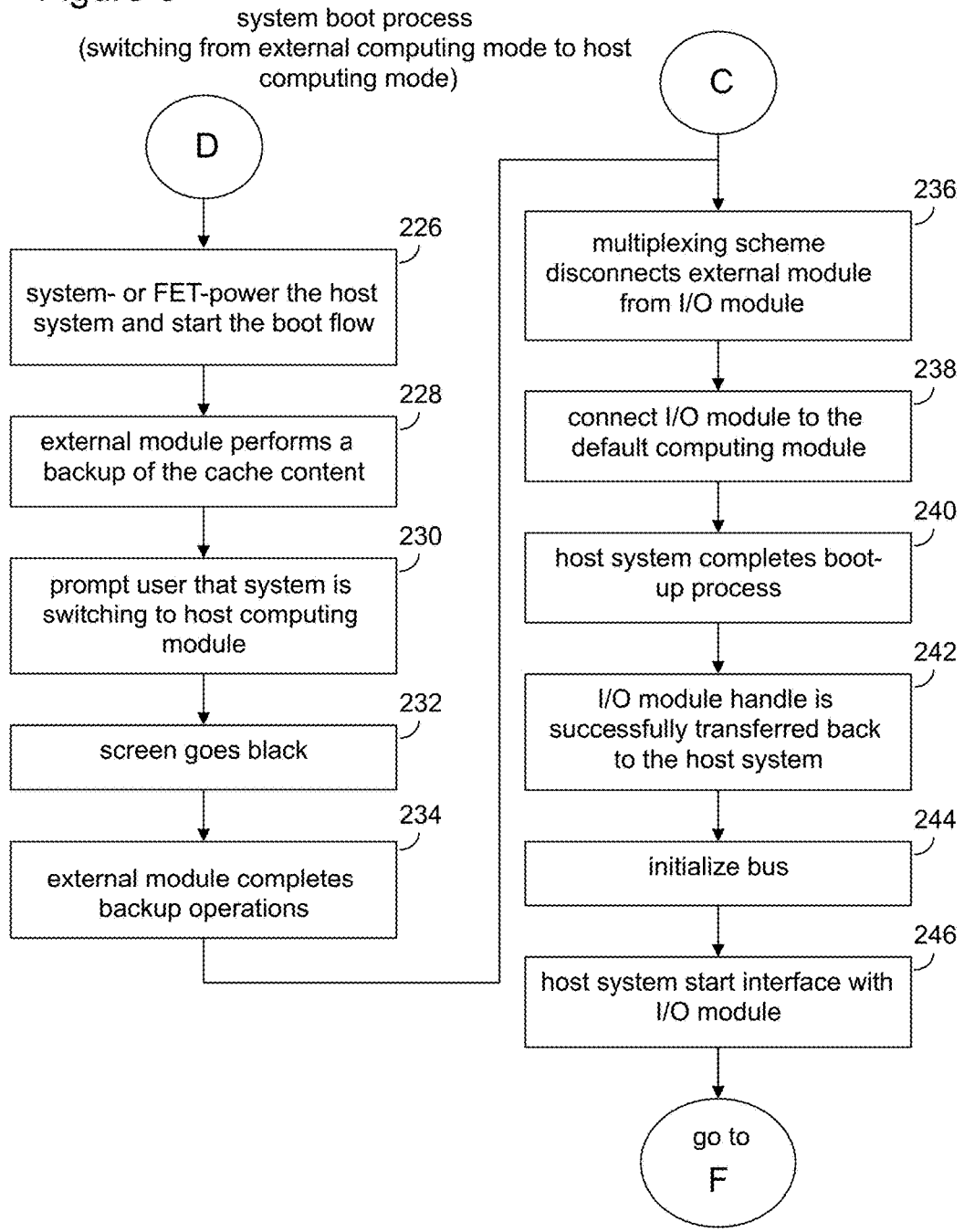

FIGS. 4-7 are process flow charts showing the universal interconnection scheme 200, according to some embodiments, to be used with the universal scalable system 100. FIG. 4 features the detection process, FIG. 5 illustrates the selection process, and FIGS. 6 and 7 are the system boot processes, with FIG. 6 showing the external computing mode 350 operations when the PC-on-a-card or other external module 150 is installed, and FIG. 7 showing the host computing mode 50 operations when no external card 150 is configurable (as described further below, the external module may be detected, but not connected). Although these operations are illustrated in a particular order, many of these operations may take place in a sequence not illustrated, without departing from the goals of the universal interconnection scheme 200.

Starting with FIG. 4, in some embodiments, the detection process includes hardware operations (blocks 203, 204, and 206) and software operations (blocks 210 and 212). System designers of ordinary skill in the art recognize that operations taking place in software may be replicated in hardware, and vice-versa.

First, the universal scalable system 100 boots (powers on) with the host computing module 102, using the host operating system (block 202). Commencing an external computing module detection state (block 203), the external computing module 150 is detected as being attached via a USB protocol, in some embodiments (block 204). If detected, a check is made to see whether the external module 150 is electrically connected to the system 102 (block 206). If so, the software 126 in the bridge 122 will provide indication to the user (block 208) and control will proceed to step 214 in FIG. 5 (B). Thus completes one possible path of the detection process. If the external computing module 150 is detected as being attached (block 204) but is not electrically connected (block 206), control will proceed to step 214 in FIG. 6 (C), in which a series of steps will disconnect the external module 150 from the I/O module 104 and get the default computing module 170 operating (described in more detail below).

The system can also be interrupted to switch the external computing module 150. A software interrupt routine may be invoked (block 210) and, until an interrupt is detected, nothing happens (block 212). If an interrupt is detected, the detection process will switch to the hardware side of the process, in which the external computing module 150 is detected and, if possible, connected to (blocks 204 and 206).

In some embodiments, to safely remove the external computing module 150 from the universal scalable system 100 or to switch computing modes (whether from host computing mode 50 to external computing mode 350, or vice-versa), the user can interrupt the system through a mechanical switch or by a software intervention, such as from an application loaded into the operating system. System designers of ordinary skill in the art recognize a number of different ways this interrupt operation may be performed.

Once control proceeds to FIG. 5 (B), the external module 150 has been detected and is connected and the selection process commences. The user is prompted to choose a computing mode (block 214). If the user selects the host computing mode (block 216), a check is next made whether the current computing mode is already the host computing mode (block 218) and, if so, no action needs to be taken to change the computing mode. A final error check is made (block 222) and, if no error is detected, control proceeds back to the detection process (A) following the default boot operation (block 202). If an error is detected (block 222), the system is rebooted to the host system (block 224) and the procedure is complete.

If, on the other hand, the user selects the host computing mode (block 216) but the current computing mode is the external computing mode (block 218), control proceeds to the system boot process for the external computing mode in FIG. 6 (D).

If instead the user selects the external computing mode 350 (block 216), a check is next made whether the current computing mode is already the external computing mode (block 220). If so, no action needs to be taken to change the computing mode. A final error check is made (block 222) and, of no error is detected, control proceeds back to the detection process (A) following the default boot operation (block 202). If an error is detected (block 222), the system is rebooted to the host system (block 224) and the procedure is complete.

Where the user selects the external computing mode 350 (block 216) and the current computing mode is the host computing mode 50 (block 220), control proceeds to the system boot process in the host computing mode of FIG. 7 (E).

Looking first at the external computing mode 350 system boot process of FIG. 6, the host system will first be system-powered by turning on a power switch or field effect transistor (FET)-powered switch such that the boot process commences (block 226). The external module 150 backs up the cache content of its DRAM 162 (block 228).

The user is prompted that the system is being switched to the host computing mode 50 (block 230). This may be done in a variety of ways, including a message to a display screen, an audible sound or sequence of sounds, a blinking light on a light emitting diode (LED) visible to the user, or by other means. In some embodiments, the display screen goes black (block 232), which also indicates to the user that the switch from external computing mode 350 to the host computing mode 50 is taking place. The external computing module 150 completes its back up operation, in which data or contents of the memory cache are saved (block 234). Subsequently, when the system is booted up, the saved information enables a very fast initialization process.

The software 126, located in the bridge 122 of the I/O module 104, employs a multiplexing scheme, in some embodiments, to disconnect the external module 150 from the I/O module 104 (block 236). In some embodiments, the software 126 includes two portions, a first portion that is executed by the CPU 174 in the host system 102, and a second portion that is executed by the CPU 158 in the external module 150.

The I/O module 104 is then connected to the default computing module 170 (block 238). During the period in which no CPU is available, operations are performed automatically using firmware, hardware, or a combination of the two, in some embodiments. The host system 102 then completes the boot-up process (block 240). An I/O handle is successfully transferred to the host system 102 (block 242), a bus is initialized (block 244), and the host system commences its interface with the I/O module 104 (block 246).

Once the universal scalable system 100 is operating in host mode 50, control proceeds back to FIG. 5 (F), where a final error check is made (block 222). Where there are no errors, the universal interconnection scheme 200 returns to the detection process (A) of FIG. 4 and the process begins anew. If an error does occur, the system 100 is rebooted to the host system mode 50 (block 224).

FIG. 7 illustrates the system boot process when the universal scalable system 100 is to be put in the host computing mode 50 from the external computing mode 350, according to some embodiments. The external module 150 will be system- or FET-powered such that the boot process commences (block 248). The host system 102 OS backs up the cache content of the host DRAM 178 (block 250). The host system 102 prompts the user that the system 100 is being switched from host computing mode 50 to external computing mode 350 (block 252) and, as in FIG. 6, there are many ways in which the user may be notified. As one option, where a display is used, the display screen goes black (block 254), indicating that the mode is being changed. The external module 150 completes its backup (block 234).

The software 126, located in the bridge 122 of the I/O module 104, employs a multiplexing scheme to disconnect the default computing module 170 from the I/O module 104 (block 258). The I/O module 104 is then connected to the external module 150 (block 260). Firmware/hardware in the external module 150 then completes the boot-up process (block 262). An I/O handle is successfully transferred to the external module 150 (block 264). Based on a negotiation between host computing and device computing, a device speed, configurability, computing mode, and other characteristics of the external module are identified (block 266). A USB bus is initialized (block 268), and the external module 150 commences its interface with the I/O module 104 via the USB connector 148 (block 270).

Once the universal scalable system 100 is operating in external computing mode 350, control proceeds back to FIG. 5 (F), where a final error check is made (block 222). Where there are no errors, the universal interconnection scheme 200 returns to the detection process (A) of FIG. 4 and the process begins anew. If an error does occur, the system 100 is rebooted to the host system mode 50 (block 224).

In other embodiments, the capability of the CPUs is switched such that the default computing module 170 has a core CPU while the external module 150 has an atomic CPU. Such a system would have higher processing power when the system is mobile and lower processing power when the system is docked.

Thus completes the operations of the universal interconnection scheme 200 as employed on the universal scalable system of FIG. 1, according to some embodiments. By having the capability of switching between a CPU having limited capability (atom) to one with a great deal more processing power (core), and back again, the system 100 is likely to satisfy users for a variety of circumstances.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:
1. A system comprising:
   a host computing module comprising:
      an input/output (I/O) module coupled to a bridge, the bridge comprising software and a hub;
      a default computing module comprising:
         a central processing unit (CPU) having a first processing capability;
         a platform controller hub (PCH);
         non-volatile storage; and
         volatile storage; and
      a Universal Serial Bus (USB) Type C connector for coupling the host computing module to an external module, the connector being capable of carrying audio, video, and power, the external module comprising:
         a second CPU having a second processing capability;
         a second PCH;
         a second non-volatile storage; and
         a second volatile storage;
wherein software on the bridge prompts a user to select between the host computing module and the external computing module and, based on the selection, either:
   activates the second CPU and disables the first CPU, wherein the software further performs a backup operation of a memory cache of the default computing module; or
   activates the second CPU and leaves the first CPU enabled.

2. The system of claim 1, wherein the first processing capability is lower than the second processing capability.

3. The system of claim 1, further comprising:
   a slot for coupling the external module to the host computing module.

4. The system of claim 1, wherein the external module is a "PC-on-a-card" module.

5. The system of claim 1, wherein the external module is a "PC-on-a-stick" module.

6. The system of claim 1, wherein the external module is part of a docking station.

7. The system of claim 1, wherein the external module is a smart card.

8. A universal interconnection method operable upon a system comprising an input/output (I/O) unit, a default computing module comprising a central processing unit (CPU) and a universal serial bus (USB) connector, the method comprising:
- detecting an interrupt, the interrupt to indicate the coupling of an external module to the I/O unit of the system;
- confirming that the external module is electrically coupled to the I/O unit through the USB connector;
- prompting a user to select between host computing mode and external computing mode;
- performing a backup operation of a memory cache of the default computing module in response to the user selecting external computing mode;
- blacking a display coupled to an embedded display port connector of the I/O unit of the system to indicate to the user that a switch between default computing module and external module is taking place;
- electrically decoupling the default computing module from the I/O unit; and
- electrically coupling the external module to the I/O unit;

wherein the CPU is disabled and a second CPU located on the external module is activated.

9. The method of claim 8, further comprising:
determining a speed mode of the external device.

10. The method of claim 9, further comprising:
initializing a USB bus.

11. The method of claim 8, further comprising:
receiving a request from a user to change from a host computing mode to an external computing mode.

12. The method of claim 8, wherein the method operations are performed by a software program executed by either the CPU or by the second CPU.

13. The method of claim 8, further comprising:
transferring an I/O handle from the default computing module to the external module.

14. A universal interconnection method operable upon a system comprising an input/output (I/O) unit, a default computing module comprising a central processing unit (CPU) and a connector, the method comprising:
- detecting an interrupt, the interrupt to indicate the coupling of an external module to the I/O unit of the system;
- confirming that the external module is electrically coupled to the I/O unit through the connector;
- prompting a user to select between host computing mode and external computing mode;
- performing a backup operation of a memory cache of the external module in response to the user selecting default computing mode;
- blacking a display coupled to an embedded display port connector of the I/O unit of the system to indicate to the user that a switch between default computing module and external module is taking place;
- electrically decoupling the external module from the I/O unit; and
- electrically coupling the default computing module to the I/O unit.

15. The universal interconnection method of claim 14, further comprising:
transferring an I/O module handle to the default computing module.

16. The universal interconnection method of claim 14, further comprising:
configuring a speed mode of the default computing module.

17. The universal interconnection method of claim 14, wherein the connector is a universal serial bus connector according to a Type C specification.

18. The universal interconnection method of claim 14, further comprising:
transferring an I/O module handle to from the external module to the default computing module.

* * * * *